Aug. 23, 1938.   J. E. BREUER   2,127,639
FISH PLUG
Filed Oct. 13, 1936
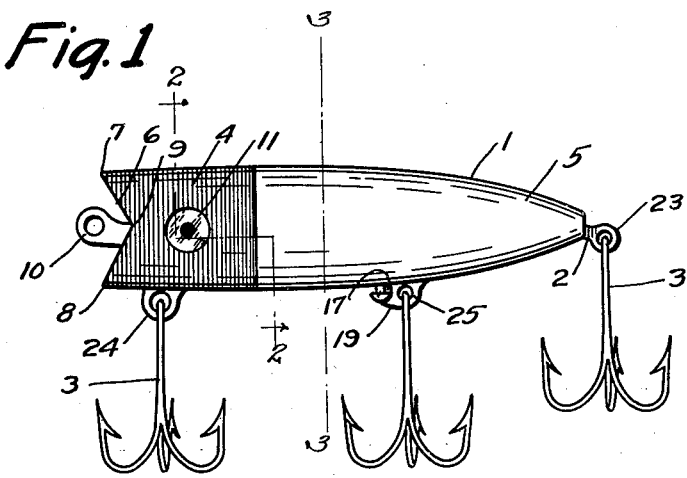
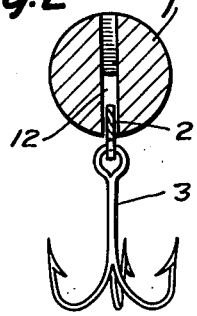
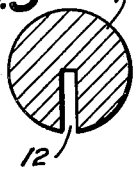
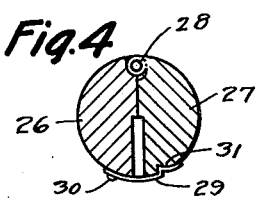
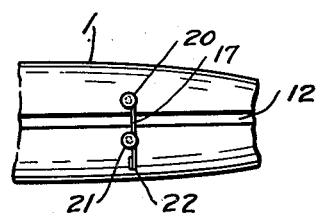
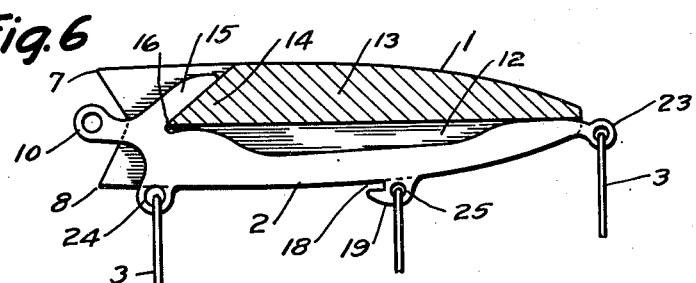
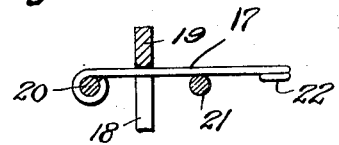
INVENTOR.
John Edward Breuer
BY James Harrison Bowen
ATTORNEY.

Patented Aug. 23, 1938

2,127,639

UNITED STATES PATENT OFFICE 2,127,639

FISH PLUG

John Edward Breuer, Great Neck, N. Y.

Application October 13, 1936, Serial No. 105,413

6 Claims. (Cl. 43—46)

The purpose of this invention is to provide a fishing plug or bait having a body portion with hooks extending therefrom, in which the color and shape of the body portion may readily be changed, so that it will only be necessary to carry one set or assembly of hooks, whereas one may carry any number of the body portions.

The invention is a fish plug of the type having a body portion simulating a minnow or a fish, with a plurality of hooks suspended therefrom, in which the hooks are mounted upon a member separable from the body portion forming a complete hook assembly with a removable and changeable body portion.

Fishing plugs have been made of various designs, sizes and types, and as fish will bite or strike at a plug of one color or shape one day, and another another, it is necessary to carry any number of plugs of different colors, and as all plugs are equipped with hooks extending therefrom they are inconvenient to carry, especially through the woods or brush, so that it is desired to provide means for readily changing the shape, design, and color of the plug without carrying a large number of plugs with hooks thereon.

The object of the invention is, therefore, to provide a fish plug in which any number of different plugs may be mounted upon one hook assembly, so that if fish do not bite or strike a plug of one color, a plug of another color or shape may readily be substituted on a common hook assembly.

Another object of the invention is to provide a fish plug in which the color and shape may readily be changed, in which the body portion is removably mounted upon the hook assembly.

Another object is to provide a fish plug having a removable body portion and a hook assembly, in which the complete strain is taken by the hook assembly.

Another object is to provide a fish plug having an interchangeable body portion and a hook assembly, in which the body portion may be removed and replaced without removing the hook assembly from the line.

A further object of the invention is to provide a fish plug having a hook assembly and a removable body portion, in which means is provided for readily securing the body portion on the hook assembly.

And a still further object is to provide a fish plug having a hook assembly and a removable body portion, which is of a simple and economical construction.

With these ends in view the invention embodies a fish plug having a hook assembly comprising a relatively flat member with eyes extending from the ends and one side, and with hooks in some of the eyes, and a cover or body portion having a slot in which said flat member of the hook assembly may be placed, in which a V-shaped notch is provided in the flat member to fit over a correspondingly shaped portion of the body portion, and a latch is provided for securing the said hook assembly in the body portion.

Other features and advantages of the invention will appear from the following description, taken in connection with the drawing, wherein:

Figure 1 is a view showing a side elevation of the fish plug with a coil at the end of the latch omitted.

Figure 2 is a view showing a cross section through the plug, on line 2—2 of Figure 1.

Figure 3 is a view showing a similar section with the hook assembly omitted, on line 3—3 of Figure 1.

Figure 4 is a view similar to that shown in Figure 3, showing a body portion of an alternate design, in which the two halves are secured together.

Figure 5 is a detail showing the latch for securing the hook assembly in the body portion in the design shown in Figure 1.

Figure 6 is a view showing a longitudinal section through the plug, showing the shape of the hook assembly.

Figure 7 is a detail showing the latch with a portion of the hook, and with the body portion of the plug and the heads of the pins omitted.

The plug illustrated resembles the plug commonly called "minnow", however, it will be understood that the head or body may be of any configuration, and slanting or sloping surfaces may be provided at the forward end to cause the plug to travel close to the surface or down into the water or other surfaces may be provided for giving the plug a zig zag or wavy motion, or any devices may be used in combination with the plug for imparting different motions or the like thereto.

In the drawing the plug is shown as it may be made, wherein numeral 1 indicates the body portion, numeral 2 the plate forming the base of the hook assembly, and numeral 3 the hooks.

The part 1 may be made of wood or any material, and this may be made of the shape or design shown in Figure 1, and the outer surface may be colored with a forward part 4 simulating a head, and with a rear portion 5 simulating the body of a fish, and although this is shown substantially round it will be understood that it may be of any shape or design. The forward end is preferably formed with a V-shaped notch 6 representing the mouth of a fish, and this is formed with surfaces extending inward from points 7 and 8 to a point 9 and an eye 10, on the forward end of the member 2, and to which the line may be connected, may be located in this notch. The head portion may also be provided with eyes 11 on the opposite sides.

The part 1 is formed with a longitudinal slot 12 extending from the forward to the rear end, providing two halves on each side of the member 2, with the halves connected by a central section 13. It will be noted that the forward end of the slot is formed with a V-shape, as shown at the point 14, and the member 2 is formed with a prong 15, providing a V-shaped notch 16 into which the vertex of the section 14 extends, thereby locking the part 1 on the part 2, and preventing movement of one part in relation to the other when the part 1 is held in place by the latch on the under side, which is formed by a strand 17 extending into a notch 18 in a hook 19 on the under side of the member 2. The part 17 consists of a relatively thin wire pivotally attached to the part 1 by a pin 20, and this is held in place by a corresponding pin 21 on the opposite side of the slot 12 with the strand extending into the notch 18 of the hook 19. The end of the strand is enlarged or provided with a coil 22 by which it may readily be gripped or snapped over the head of the pin 21 when opening or closing the latch. It will be noted that this strand may readily be moved by the thumb or one finger, and when open it will permit the member 2 to pass out of the slot in the member 1. The member 1 may, therefore, readily be removed and replaced by another similar member of another color or of another design and these parts may be interchanged in a comparatively few seconds without removing the hook assembly from the line.

The member 2 is preferably formed of a flat piece of metal or of any suitable material, and this is shaped as shown in Figure 6 with the eye 10 at one end, an eye 23 at the opposite end, and intermediate eyes 24 and 25, in which the eye 25 is formed in the rear portion of the hook 19, and all of the eyes extend beyond the lower edge of the flat portion of the member. It will be understood that the drawing shows only a typical arrangement, as any number of eyes may be provided so that any number of hooks may be mounted on the member 2; and it will also be understood that the hook assembly may be formed in any manner or by any means, and may be removably attached to the plug in any manner or by any means.

The body portion may be made of any type or design to facilitate its being placed upon or removed from the hook assembly, and an alternate design is shown in Figure 4, in which the body portion is made in two halves 26 and 27 and these are held together by a hinge 28 at one side, and the lower edge may be held by a spring latch 29 pivotally mounted on a pin 30, and adapted to snap into a notch 31 on the opposite side of the slot in which the hook assembly may be held. This part may, therefore, be formed in any manner and held upon the hook assembly by any means.

It will be understood that other changes may be made without departing from the spirit of the invention. One of which changes may be in the use of a body portion in which the proportionate dimensions of the length and width are materially changed, another may be in the use of other means for mounting the hook assembly in the body portion, and still another may be in the use of other means for securing the hook assembly in the body portion.

The construction will readily be understood from the foregoing description. In use the device may be provided as shown and described, and it will be noted that the assembly may be permanently attached to the end of the line, and plugs or body portions of different colors and designs may be readily be placed upon the hook assembly and removed therefrom, so that if fish do not bite or strike at one color, another color may be substituted or a body portion of another shape may be substituted, and these plugs or body portions of different shapes or designs may be conveniently carried because they do not have hooks extending therefrom.

Having thus fully described the invention, what I claim as new and desire to secure by Letters Patent, is:

1. A fish plug comprising a body portion having a longitudinal slot therein, a flat plate adapted to be removably mounted in said slot, said plate having eyes in which hooks are mounted, and means removably holding said plate in said plug, characterized in that the holding means comprises a latch on the under side of the body portion cooperating with a hook on said flat plate.

2. A fish plug comprising a body portion having a longitudinal slot therein, a flat plate adapted to be removably mounted in said slot, said plate having eyes in which hooks are mounted, and means removably holding said plate in said plug, in which the forward end of the flat plate is provided with a prong extending upward and backward forming a V-notch, and the body portion is provided with a similarly shaped section which forms the said projection adapted to extend into said notch.

3. A fishing plug of the type having a body portion and a hook assembly, in which the said body portion is readily removed and replaced, and, therefore, interchangeable, said body portion having a continuous longitudinal slot through the lower portion thereof, and extending upward and backward at the forward end forming a wedge-shaped section by which the two sides thereof are joined, and said hook assembly comprising a plate fitting into said longitudinal slot, having a projection at the forward end extending upward over the said wedge-shaped section of the body member, providing holding means between the two members, and a hook on said body portion adapted to hold said hook assembly in said slot.

4. A fishing plug comprising a relatively cylindrical tapering body member having a longitudinal slot across the forward end, and extending continuously through the lower part thereof, a projection in the slot in said body member positioned adjacent the forward end of said slot and in combination therewith a hook assembly comprising a removable plate with a line holding eye at the forward end, and a prong also at the forward end thereof adapted to hold over said projection in the body member, eyes for hooks extending from the lower edge, and means removably holding said plate in the slot of said body member.

5. In combination, a tapering cylindrical body member adapted to form a fishing plug having a vertical slot at one end and extending continuously through the lower portion thereof, a projection in the slot in said body member positioned adjacent the forward end of said slot and a plate having hook and line holding eyes extending from the edges thereof, and a recess in the inner edge of the plate adapted to hold over the projection in the slot of said body member, and a latch adapted to removably hold the hook assembly in said body member.

6. A fishing plug as described in claim 5, characterized in that the latch comprises a hook mounted on said body member, and adapted to extend across the slot therein.

JOHN EDWARD BREUER.